No. 640,954. Patented Jan. 9, 1900.
S. RUFI.
HOG CATCHING IMPLEMENT.
(Application filed Nov. 25, 1898.)
(No Model.)
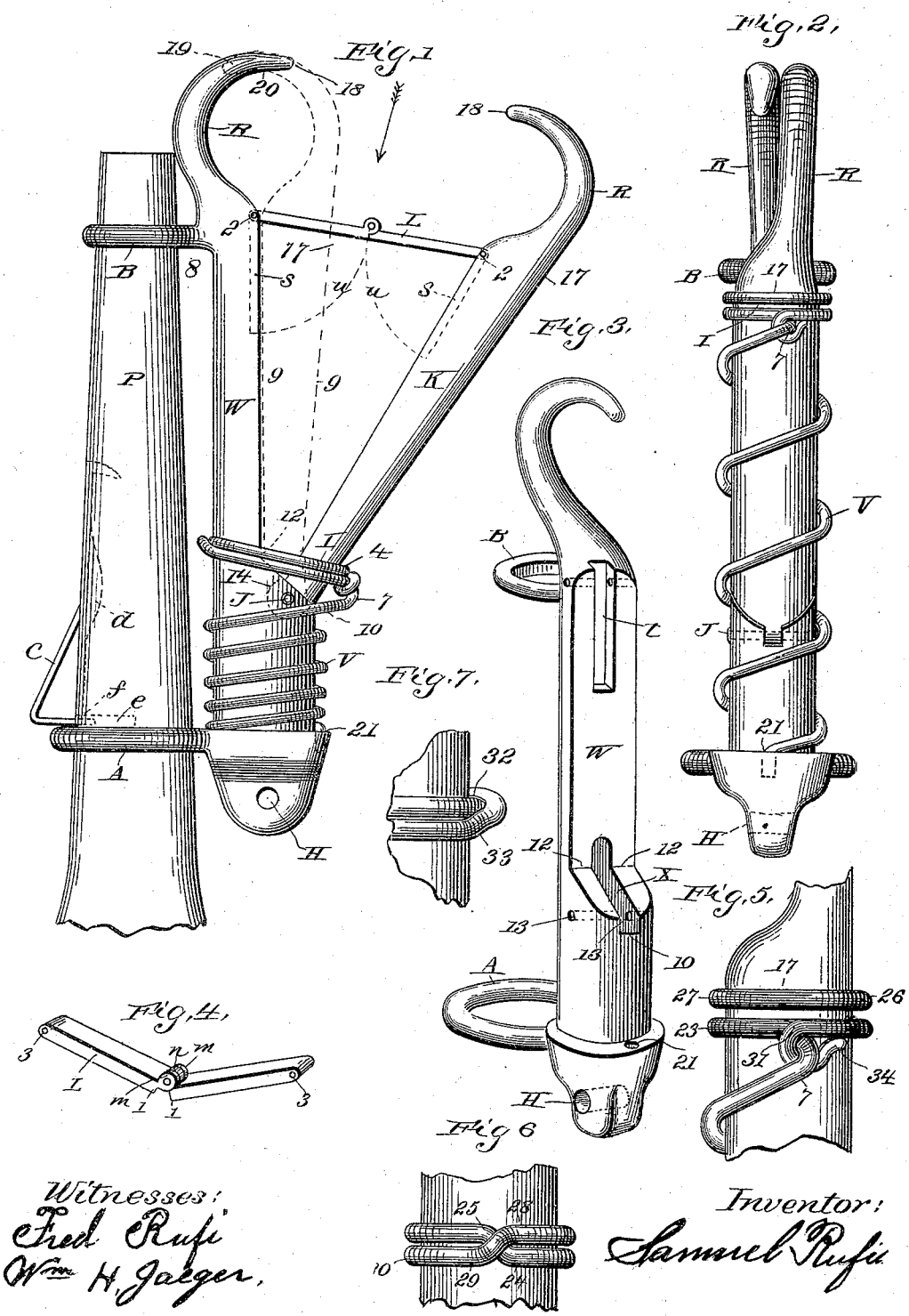
Witnesses:
Fred Rufi
Wm H. Jaeger
Inventor:
Samuel Rufi
THE NORRIS PETERS CO., PHOTO-LITHO., WASHINGTON, D. C.

UNITED STATES PATENT OFFICE.

SAMUEL RUFI, OF CHAMOIS, MISSOURI.

HOG-CATCHING IMPLEMENT.

SPECIFICATION forming part of Letters Patent No. 640,954, dated January 9, 1900.

Application filed November 25, 1898. Serial No. 697,424. (No model.)

*To all whom it may concern:*

Be it known that I, SAMUEL RUFI, a citizen of the United States, residing at Chamois, in the county of Osage and State of Missouri, have invented a new and useful Hog-Catching Implement, of which the following is a specification.

My invention relates to improvements in hog-catching implements that automatically grasp the leg of the hog or animal when coming in contact therewith; and the objects of my improvement are, first, to provide a joint-trigger to hold the clutches distended until coming in contact with the leg of the animal; second, to afford facilities for the proper adjustment of the clutches to legs of different size; third, that when so desired the implement can be left on the leg of the animal and the animal held secure by a rope attached to the implement; fourth, to reduce the much-complicated mechanism heretofore found in such implements and replacing therefor strength and simplicity; and, fifth, an implement whereto a pole can be attached and detached, when so desired, by a catch-spring and more fully described later. I attain these objects by the mechanism illustrated in the accompanying drawings, in which—

Figure 1 illustrates the front view of the implement in its entirety attached to a pole and set ready for use, Fig. 2 being a side view of the catcher when closed. Fig. 3 sets forth in perspective detail that part of the implement wherefrom the combination parts have been removed in order to better illustrate the same. Fig. 4 illustrates the jointed trigger L, that holds the clutches apart, as shown in Fig. 1. Figs. 5, 6, and 7 show the respective positions in which the ring I is formed and explained later.

Similar letters and figures refer to similar parts throughout the several views.

W K are the clutches, the front ends of which have the curved prongs R R, the clutch W having the two sockets A B formed thereon, the socket A being rotund and of double capacity to that of B, which has a cornered surface within in order to hold firmly, preventing the implement from turning on the pole when in use, the pole P being tapered down so as to enter the sockets and held by catch-spring c, which upon the pole being thrust into the sockets is borne down in the groove d and hole e, and when released catching behind the socket A and holding firmly by bearing against f and otherwise. Both ends of the pole may be tapered down, as stated, with one end provided with spring c, while the other end may be left minus this spring and either end used, as preferred. The movable clutch K is pivotally connected to stationary clutch W, as shown in Fig. 1, in the cavity X, (see Fig. 3,) and held by bolt J, as shown in Figs. 1 and 2, by passing through the holes 13 13. (Further shown in Fig. 3.) The cavity X permits free movement of clutch K from points 10 to 12, as shown in Figs. 1 and 3, the movable clutch K to be narrow at the lower end at 4 and gaining in width to point 17 for purposes explained later. The prongs R R are constructed round, smooth, and tapering into blunt points 18 18, as shown in Fig. 1, said prongs to pass alongside of one another, as shown in Fig. 2, and also passing one another in a straight line, as shown in Fig. 1 at 20, said prongs also being of sufficient length to pass each other considerably, as shown at 19 in Fig. 1.

The jointed trigger L, as shown in Fig. 4, is in two parts of equal length, the one part having the two hinge-shoulders m m, the other part the one shoulder n, and said shoulders being pivotally connected, as shown. The two stay-shoulders 1 1 hold the trigger in alinement when set as shown in Fig. 1. This trigger is also pivotally connected between the clutches by pivots 2 2, as shown in Fig. 1, through the holes 3 3, as shown in Fig. 4. This trigger when thrown out of alinement in coming in contact with the leg of the animal will fold inward, as indicated by dotted lines u u, into the dotted grooves S S, as shown in Fig. 1, and said grooves being exact counterparts of each other and better illustrated in perspective at t in Fig. 3.

The coil-spring V, encircling the implement, terminates at the lower end in the hole 21, as indicated by dotted lines in Fig. 2, and the upper end into the ring I at 7, as shown in Figs 1 and 2. This ring is formed by the continuation of said spring V by encircling the implement when closed at 8 and 17 and formed by passing about the implement twice in the following manner: by curving at point 7, as shown in Figs. 2 and 5, and passing about at point 23 (see Fig. 5) to the opposite side to point 24 in Fig. 6 and be curved upward, as shown, to point 25, and then passing about above the starting-place in a straight line, as shown in Fig. 5, from 26 to 27, and returning to point 28 in Fig. 6, and at this point curved downward over the first strand to 29, and then passing on at point 30 to point 31 in Fig. 5, and then curved underneath through at point 7 and terminating the end in a clench at 34, as shown in Fig. 5, and that where the one strand crosses the other it should be bent inward against the other at points 32 and 33. It will become cognizant that a ring of this classification will bear the strain equitably on both strands when in use and take the place of the ring or washer heretofore used on others.

To set the implement ready for use, the ring I is pressed backward sufficiently far enough to release the movable clutch K, which upon being moved outward will bring the trigger L into alinement between the clutches and hold them distended. In this position the spring-pressure will be greatest at point 4, as the spring terminates into the ring at this point, as shown in Fig. 1. The operator now holding the catcher by the pole P and rope fastened to catcher at H advances toward the hog or animal he wishes to secure in such a manner that he can rapidly shove or thrust the catcher toward the leg, and as it enters between the two prongs R R, as indicated by arrow, it will come in contact with the trigger L, causing the same to be thrown backward out of alinement, and thus releasing the spring V, which presses forward the ring I, causing the clutches to be locked together about the leg. As aforesaid, the movable clutch K increases in width from point 4 to 17. This is for the purpose that when a small or average leg is grasped by the implement it will close or nearly so; but when a large leg is grasped the ring I is yet of sufficient size to slide forward over the narrower part of the clutches, and thus yet retaining a firm hold. It will thus become cognizant that legs of different sizes can be caught and held by an implement of this classification. In order to release the animal, the ring I is pressed backward, permitting the clutches to part and releasing the leg.

In an implement of the above description its simplicity at once becomes manifest, can also be cheaply manufactured, is effectual for purposes desired, and complete in its working functions.

I am aware that prior to my invention hog-catchers have been made to close about the leg of a hog when coming in contact therewith. Hence I do not claim such a combination broadly; but What I do claim as my invention, and desire to secure by Letters Patent, is—

In an animal catching and holding tool, in combination, a pair of clamping-arms pivoted together and formed to seize the leg of an animal, registering longitudinal grooves on the inner sides of said arms, a ring encircling said arms, a spring for forcing said ring toward the clamping end of the arms, and a two-part brace pivoted at its ends to the respective arms, and connected together in the middle by a rule-joint constructed to open toward the pivot of the arms and means for attaching one of the arms to a pole, substantially as described.

Signed by me at Chamois, Osage county, Missouri, this 17th day of July, 1899.

SAMUEL RUFI.

Witnesses:
WM. JAEGER,
JOEL A. BOYER.